(12) United States Patent
Pramod et al.

(10) Patent No.: US 11,496,076 B2
(45) Date of Patent: Nov. 8, 2022

(54) OPTIMAL TORQUE CONTROL OF MULTIPHASE SYNCHRONOUS MOTORS WITH OPEN CIRCUIT CONDITION

(71) Applicant: STEERING SOLUTIONS IP HOLDING CORPORATION, Saginaw, MI (US)

(72) Inventors: Prerit Pramod, Saginaw, MI (US); Prathima Nuli, Okemos, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 113 days.

(21) Appl. No.: 17/064,165

(22) Filed: Oct. 6, 2020

(65) Prior Publication Data

US 2022/0109387 A1 Apr. 7, 2022

(51) Int. Cl.
| | |
|---|---|
| *H02P 6/10* | (2006.01) |
| *B62D 5/04* | (2006.01) |
| *H02P 25/22* | (2006.01) |
| *H02P 27/06* | (2006.01) |
| *H02P 23/14* | (2006.01) |
| *H02K 21/14* | (2006.01) |

(Continued)

(52) U.S. Cl.
CPC .............. *H02P 6/10* (2013.01); *B62D 5/0463* (2013.01); *H02K 1/223* (2013.01); *H02K 21/14* (2013.01); *H02P 23/14* (2013.01); *H02P 25/024* (2016.02); *H02P 25/22* (2013.01); *H02P 27/06* (2013.01)

(58) Field of Classification Search
CPC .......... H02P 6/10; H02P 23/14; H02P 25/024; H02P 25/22; H02P 27/06; B62D 5/0463; H02K 1/223; H02K 21/14
See application file for complete search history.

(56) References Cited

U.S. PATENT DOCUMENTS

| | | | |
|---|---|---|---|
| 6,404,156 B1 * | 6/2002 | Okanoue ................ | B62D 5/049 318/434 |
| 2009/0096394 A1 * | 4/2009 | Taniguchi ............. | H02P 29/032 318/400.09 |

(Continued)

OTHER PUBLICATIONS

Wang, et al., Design and analytical inductance calculations of five-phase fault-tolerant permanent magnet Machine, 2014 17th International Conference on Electrical Machines and Systems (ICEMS) Hangzhou, China, 2014, pp. 1639-1642.

(Continued)

*Primary Examiner* — Rina I Duda
(74) *Attorney, Agent, or Firm* — Dickinson Wright PLLC (57) ABSTRACT

A method for controller a multiphase electric machine includes, in response to a determination that a phase of the multiphase electric machine is in an open circuit condition, determining a desired torque to be generated by the multiphase electric machine and retrieving, based on the determination that the phase is in the open circuit condition and the desired torque, a set of current values to be applied to each of the other phases of the multiphase electric machine to achieve the desired torque. The method may also include applying respective current values of the set of current values to corresponding ones of the other phases of the multiphase electric machine, the set of current values being determined based on a model of the multiphase electric machine that includes the phase is in the open circuit condition.

20 Claims, 5 Drawing Sheets

(51) Int. Cl.
 H02K 1/22  (2006.01)
 H02P 25/024  (2016.01)

(56) References Cited

U.S. PATENT DOCUMENTS

| | | | | |
|---|---|---|---|---|
| 2015/0298727 A1* | 10/2015 | Kimpara | ............... | B62D 5/0484 |
| | | | | 701/43 |
| 2016/0244089 A1* | 8/2016 | Scotson | ............... | B62D 5/0487 |
| 2018/0148086 A1* | 5/2018 | Skellenger | ............... | H02P 6/12 |
| 2018/0244308 A1* | 8/2018 | Furukawa | ............ | B62D 5/0484 |

OTHER PUBLICATIONS

Arafat, et al., Transient Stability Comparison between Five-phase and Three-phase Permanent Magnet Assisted Synchronous Reluctance Motor, 2018 IEEE Transportation Electrification Conference and Expo (ITEC) Long Beach, CA, 2018, pp. 845-850.

Dharmasena, et al., Fault-Tolerant Model Predictive Control of Five-Phase PMa-SynRM under Single Phase Open-Circuit fault Condition, 2018 IEEE Transportation Electrification Conference and Expo (ITEC) Long Beach, CA, 2018, pp. 991-995.

Arafat, et al., Performance Comparison at Maximum Torque per Ampere Control between Rare Earth and Rare Earth Free Five-phase PMa-SynRM Under Open Phase Faults. 2018 IEEE Energy Conversion Congress and Exposition (ECCE), Portland, OR, 2018, pp. 784-789.

Arafat, et al., Comparison of electrical losses in an inverter-fed five-phase and three-phase permanent magnet assisted synchronous reluctance motor, 2016 IEEE Applied Power Electronics Conference and Exposition (APEC) Long Beach, CA, 2016, pp. 2847-2854.

Zheng, et al., Design and test of torque adjustment system of five-phase fault-tolerant permanent-magnet machine, 2014 17th international Conference on Electrical Machines and Systems (ICEMS), Hangzhou, 2014, pp. 1643-1647.

Arafat, et al., Open-Phase Fault Detection of a Five-Phase Permanent Magnet Assisted Synchronous Reluctance Motor Based on Symmetrical Components Theory, IEEE Transactions on Industrial Electronics, vol. 64, No. 8, pp. 6465-6474. Aug. 2017.

Arafat, et al., Optimal Phase Advance Under Fault-Tolerant Control of a Five-Phase Permanent Magnet Assisted Synchronous Reluctance Motor, IEEE Transactions on Industrial Electronics, vol. 65, No. 4, pp. 2915-2924, Apr. 2018.

* cited by examiner

OPTIMAL TORQUE CONTROL OF MULTIPHASE SYNCHRONOUS MOTORS WITH OPEN CIRCUIT CONDITION

TECHNICAL FIELD

This disclosure relates to electric machines and in particular to controlling multiphase electric machines having one phase in an open circuit condition.

BACKGROUND OF THE INVENTION

A vehicle, such as a car, truck, sport utility vehicle, crossover, mini-van, marine craft, aircraft, all-terrain vehicle, recreational vehicle, or other suitable vehicles, typically includes one or more electric machines, such as electric motors and the like. For example, the vehicle may include one or more multiphase electric machines configured to control various aspects of a steering system of the vehicle.

Multiphase electric machines, such as multiphase permanent magnet synchronous motor drives, may provide significant advantages over conventional machines, including improved efficiency, improved fault tolerance, and relatively lower torque ripple (e.g., especially under fault conditions). Accordingly, such multiphase electric machines are increasingly being used in safety critical industrial applications, particularly in the automotive and aerospace industries.

SUMMARY OF THE INVENTION

This disclosure relates generally to multiphase electric machines.

An aspect of the disclosed embodiments includes a method for controlling a multiphase electric machine. The method includes, in response to a determination that a phase of the multiphase electric machine is in an open circuit condition, determining a desired torque to be generated by the multiphase electric machine and retrieving, based on the determination that the phase is in the open circuit condition and the desired torque, a set of current values to be applied to each of the other phases of the multiphase electric machine to achieve the desired torque. The method may also include applying respective current values of the set of current values to corresponding ones of the other phases of the multiphase electric machine, the set of current values being determined based on a model of the multiphase electric machine that includes the phase is in the open circuit condition.

Another aspect of the disclosed embodiments includes a system for controlling a multiphase electric machine. The system includes a processor and a memory. The memory includes instructions that, when executed by the processor, cause the processor to: in response to a determination that a phase of the multiphase electric machine is in an open circuit condition, determine a desired torque to be generated by the multiphase electric machine; retrieve, based on the determination that the phase is in the open circuit condition and the desired torque, a set of current values to be applied to each of the other phases of the multiphase electric machine to achieve the desired torque; and apply respective current values of the set of current values to corresponding ones of the other phases of the multiphase electric machine, the set of current values being determined based on a model of the multiphase electric machine that includes the phase is in the open circuit condition.

Another aspect of the disclosed embodiments includes an apparatus for controlling a multiphase electric machine. The apparatus includes a processor and a memory. The memory includes instructions that, when executed by the processor, cause the processor to: in response to a determination that a phase of the multiphase electric machine is in an open circuit condition, determine a desired torque to be generated by the multiphase electric machine; retrieve, based on the determination that the phase is in the open circuit condition and the desired torque, a set of current values to be applied to each of the other phases of the multiphase electric machine to achieve the desired torque; and control torque ripple corresponding to the phase being in the open circuit condition by applying respective current values of the set of current values to corresponding ones of the other phases of the multiphase electric machine, the set of current values being determined based on a model of the multiphase electric machine that includes the phase is in the open circuit condition.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, typically includes one or more electric machines, such as electric motors and the like. For example, the vehicle may include one or more multiphase electric machines configured to control various aspects of a steering system of the vehicle.

Multiphase electric machines, such as multiphase permanent magnet synchronous motors, may provide significant advantages over conventional machines, including improved efficiency, improved fault tolerance, and relatively lower torque ripple (e.g., especially under fault conditions). Accordingly, such multiphase electric machines are increasingly being used in safety critical industrial applications, particularly in the automotive and aerospace industries.

However, such a multiphase electric machine may be susceptible to open circuit conditions (e.g., when one phase of the multiphase electric machine is in an open circuit condition). In such scenarios, the current supplied to the operating phases of the multiphase electric machine may cause significant torque ripple. Typically, control strategies for operating the multiphase electric machine in the open circuit condition do not include a generalized mathematical model that describes the behavior of an open circuit condition. Additionally, such control strategies are sub-optimal and may include several redundant control parameters requiring significant tuning effort.

Accordingly, systems and methods, such as those described herein, that are configured to control the operation of a multiphase electric machine having a phase in the open circuit condition so as to maintain the average torque output while simultaneously controlling (e.g., reducing or eliminating) torque ripple may be desirable. In some embodiments, the systems and methods described herein may be configured to provide a universal control scheme for optimally controlling multiphase electric machines having a single phase in the open circuit condition. The systems and methods described herein may be configured to allow for maintaining constant direct current (DC) torque of arbitrary magnitude, while minimizing torque ripple. The systems and methods described herein may be configured to may include a model based approach that allows for reducing tuning parameters (e.g., by using estimated parameters of the machine).

The systems and methods described herein may be configured to mitigate single-phase open circuit conditions completely by allowing the operation under open circuit conditions to mimic that under healthy (e.g., normal) operation. The systems and methods described herein may be applicable to all multiphase synchronous machine configurations, including salient and non-salient pole as well as permanent magnet and wound rotors.

In some embodiments, the systems and methods described herein may be configured to provide a generalized analytical model describing the effects of open circuit conditions in multiphase permanent magnet synchronous motors (PMSM). The systems and methods described herein may be configured to use the model to develop a control strategy to mitigate the open circuit condition in an optimal fashion (e.g., to obtain the maximum possible average torque and generate little to no torque ripple).

In some embodiments, the systems and methods described herein may be configured to provide a mathematical model that describes the behavior of the multiphase electric machine under an open circuit condition. The systems and methods described herein may be configured to utilized the model to develop a control scheme that results in optimal torque output (e.g., only DC output with zero torque ripple). The systems and methods described herein may be configured to provide the control scheme without additional tuning parameters. The systems and methods described herein may be configured to allow for modifying the torque command under open circuit conditions to maintain motor drive performance equivalent to healthy conditions.

In some embodiments, the systems and methods described herein may be configured to, in response to a determination that a phase of the multiphase electric machine is in an open circuit condition, determine a desired torque to be generated by the multiphase electric machine. The systems and methods described herein may be configured to retrieve, based on the determination that the phase is in the open circuit condition and the desired torque, a set of current values to be applied to each of the other phases of the multiphase electric machine to achieve the desired torque. The systems and methods described herein may be configured to apply respective current values (e.g., by generating respective current commands and applying corresponding duty cycles based on the current commands) of the set of current values to corresponding ones of the other phases of the multiphase electric machine, the set of current values being determined based on a model of the multiphase electric machine that includes the phase is in the open circuit condition.

In some embodiments, the systems and methods described herein may be configured to control torque ripple corresponding to torque generated by the multiphase electric machine in response to the respective current values of the set of current values being applied to the corresponding ones of the other phases of the multiphase electric machine. In some embodiments, the multiphase electric machine includes a salient pole multiphase electric machine. In some embodiments, the multiphase electric machine includes a non-salient pole multiphase electric machine. In some embodiments, the multiphase electric machine includes a permanent magnet multiphase electric machine. In some embodiments, the multiphase electric machine includes a wound rotor. In some embodiments, the multiphase electric machine includes five phases. In some embodiments, the multiphase electric machine is associated with a steering system of a vehicle.

Figure 1:
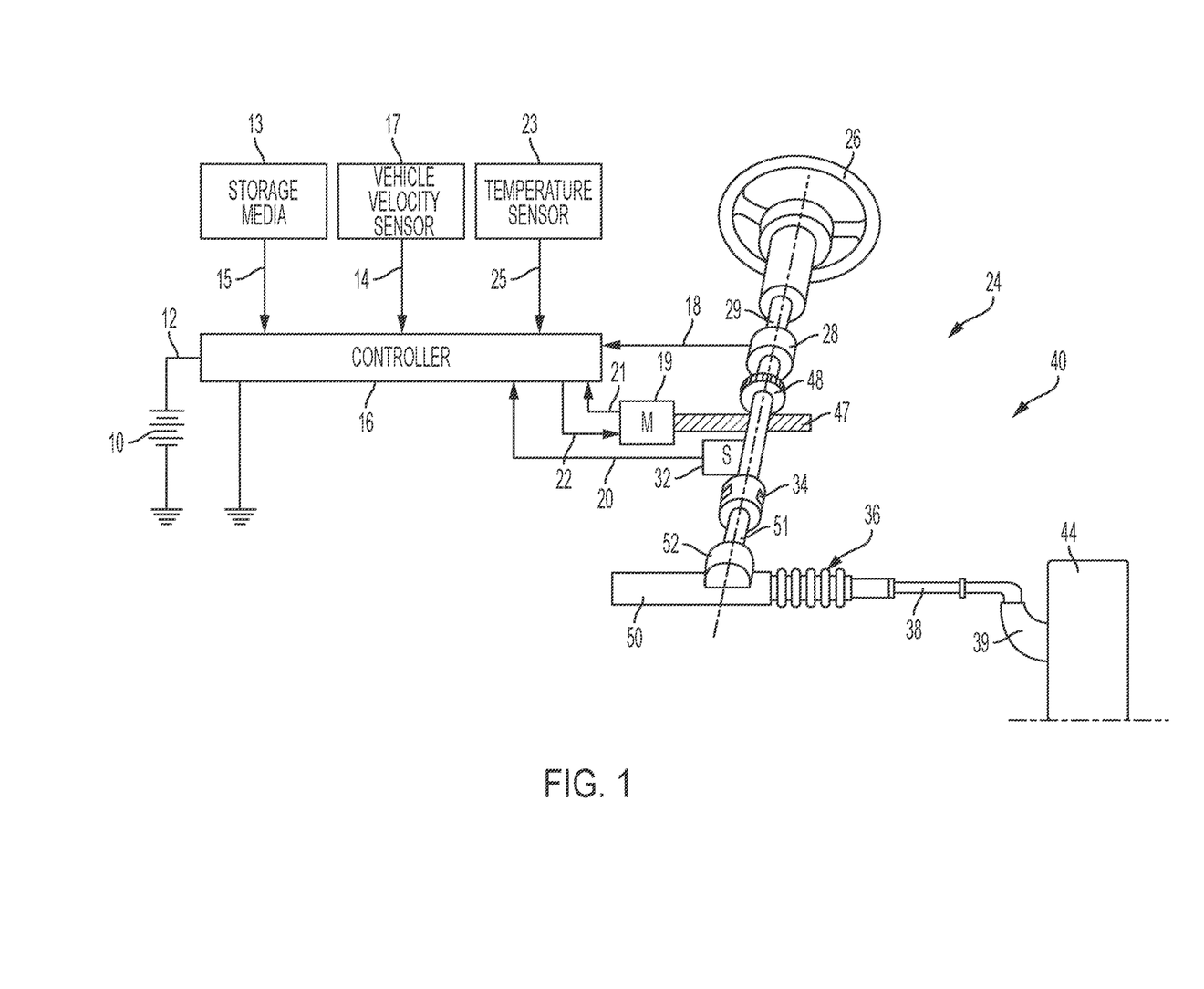
FIG. 1 generally illustrates an electronic power steering system according to the principles of the present disclosure.

FIG. 1 generally illustrates an electric power steering system (EPS) 40 according to the principles of the present disclosure. A steering mechanism 36 includes a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Steering assist is provided through the control apparatus generally designated by reference numeral 24 and includes the controller 16 and an electric machine 19, which includes a permanent magnet synchronous motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega\_m$ may be measured, calculated or a combination thereof. For example, the motor velocity $\omega\_m$ may be calculated as the change of the motor position $\theta$ as measured by a position sensor 32 over a prescribed time interval. For example, motor velocity $\omega\_m$ may be determined as the derivative of the motor position θ from the equation $\omega\_m=\Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor velocity value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time-based compensation and filtering may be employed to eliminate noise or avoid undesirable spectral characteristics.

Figure 2:
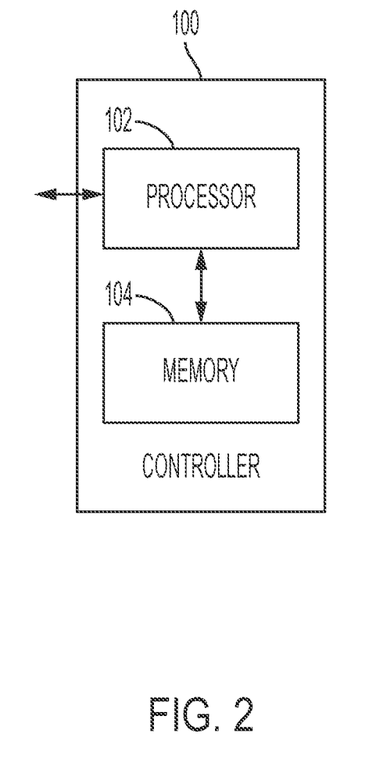
FIG. 2 generally illustrates a controller according to the principles of the present disclosure.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. vehicle As described, the EPS 40 may be associated with a vehicle. The vehicle may include a plurality of controllers and/or electronic control units. As is generally illustrated in FIG. 2, the vehicle may include a controller 100. The controller 100 may include any suitable controller. For example, the controller 100 may include features similar to the controller 16. The controller 100 may be configured to control, for example, various aspects of the vehicle, such as aspect of the EPS 40 and/or other suitable features or components of the vehicle. The controller 100 may include a processor 102 and a memory 104.

The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the vehicle.

Figure 3A:
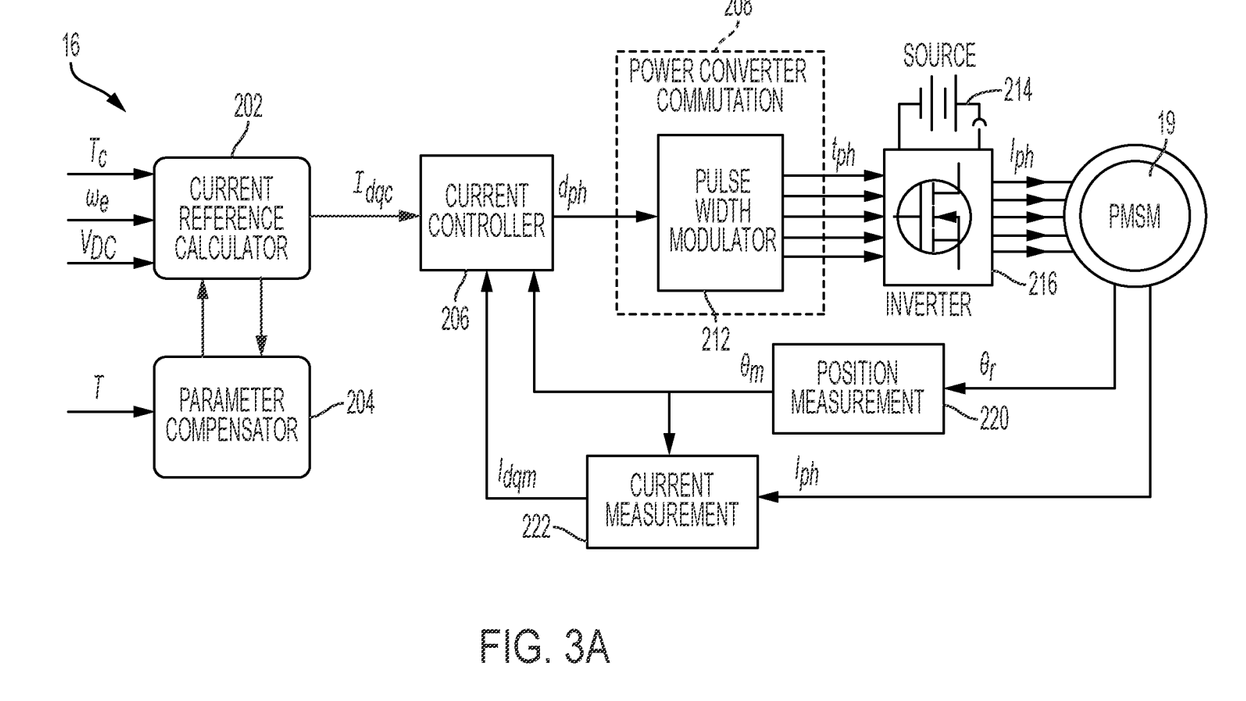
FIGS. 3A and 3B generally illustrate a block diagram of a multiphase electric machine controller according to the principles of the present disclosure.
Figure 3B:
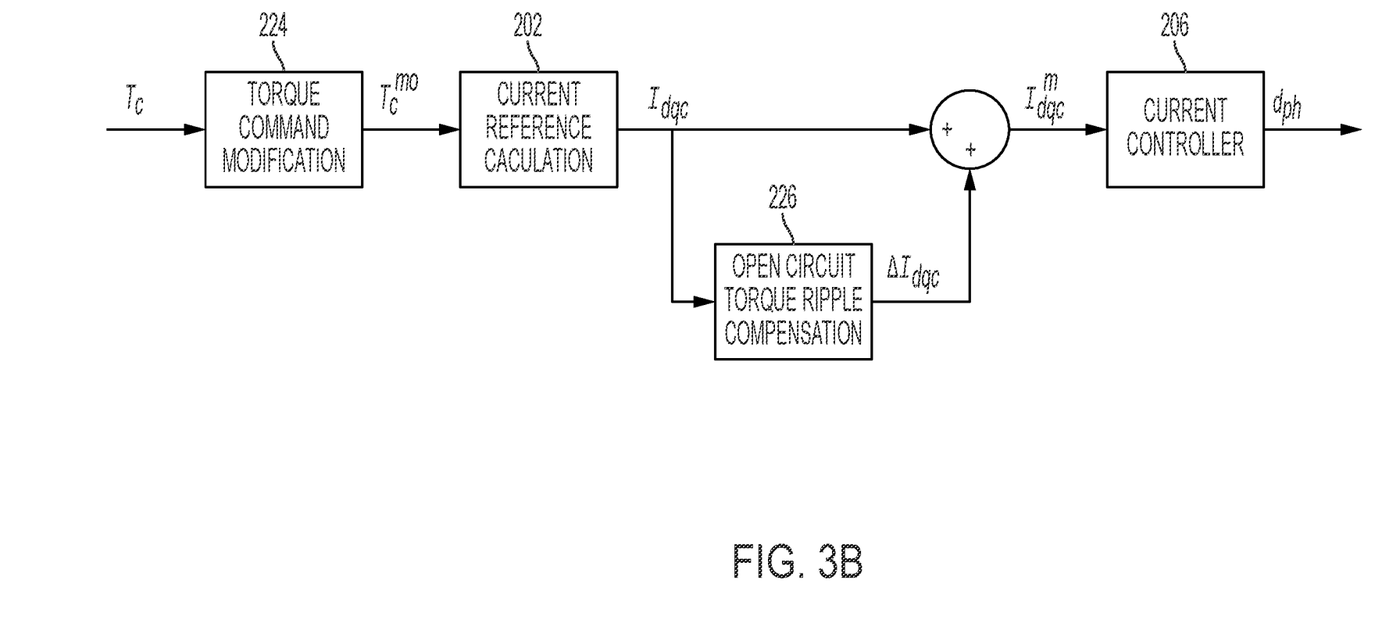

In some embodiments, the controller 100 may be configured to control various aspects of an electric machine, such as the electric machine 19, as is generally illustrated in FIGS. 3A and 3B. The machine 19 may include a multiphase electric machine. In some embodiments, as is generally illustrated, the machine 19 may include a five-phase PMSM controller. However, machine 19 may include any suitable number of phases. Additionally, or alternatively, while the machine 19 is generally illustrated and described as being associated with a vehicle and the systems thereof, the machine 19 may be configured to control or be operatively associated with any suitable application in addition to or besides the vehicle (e.g., the machine 19 may be used in any suitable application other than a vehicle, and the principles of the present disclosure may apply accordingly).

In some embodiments, the machine 19 includes a salient pole multiphase electric machine. In some embodiments, the machine 19 includes a non-salient pole multiphase electric machine. In some embodiments, machine 19 includes a permanent magnet multiphase electric machine. In some embodiments, the machine 19 includes a wound rotor.

The current reference calculator 202 converts the torque command $T_c$ into d/q current references $I_{dqc}$, which are then sent to the current controller 206. The current controller 206 may be a feedback regulator utilizing current measurements or a feedforward compensator. The temperature T can be fed into a parameter compensator 204 to adjust the PMSM electrical parameters as necessary. The current controller 206 then generates duty cycles $d_{ph}$ for each phase by the duty cycle generator 210 of the power converter commutation module 208. In some embodiments, the d/q axis current references may be converted to phase current commands by applying the inverse reference frame transformation involving measured electrical position $\theta_r$ and feedback controllers such as proportional-integral controller may be employed for each phase to generate the duty cycles for each phase.

Once the equivalent duty cycle $d_{ph}$ for each phase is generated, the pulse width modulator 212 then generates the on-times $t_{ph}$ for the different switches (e.g., FETs) in the phase legs of the power converter (e.g., the inverter 216). The inverter 216, powered by a source 214, then supplies the desired voltages to a motor (e.g., the PMSM 19), which produces currents $I_{ph}$ and electromagnetic torque $T_e$. The position $\theta_r$ and currents $I_{ph}$ are then measured and fed back to the position measurer 220 and the current measurer 222 respectively of the control system to close the control loop. The measured position $\theta_m$ is used with the phase currents to compute the d/q measured currents $I_{dqm}$ which are utilized for closed-loop current control. A voltage source inverter (VSI) is typically employed as the power converter in PMSM based electric drives.

While the design and structure of the actual machine are different for three phase and multiphase (greater than three phases) PMSMs, the same principle of vector control in the synchronous or d/q reference frame is possible for all these machines by using the appropriate transformation matrices for converting phase currents and voltages into the equivalent DC quantities in the synchronous frame.

Each of the five phases of the motor (e.g., the PMSM 19) is connected to one phase leg phases that consists of two switches. For example, the inverter 216 includes five phase legs each having two switches. The duty cycles (equivalent to on-times) of the upper and lower switches are denoted as $d_x$ and $d_x'$ respectively, where x=a, b, c, d, e for the five phase legs. The phase to ground voltages are denoted as $V_{xg}$ (e.g., $V_{ag}$ for the first phase leg, $V_{bg}$ for the second phase leg, etc.). These voltages $V_{xg}$ are controlled via the duty cycles computed by the duty cycle generator 210.

In some embodiments, the controller 100 may be configured to determine that a single phase of the machine 19 is in an open circuit condition. For example, each phase of the machine 19 may include a current sensor in communication with and/or configured to measure the phase (e.g., each phase may include a current senor) The controller 100 may monitor current measurement by each current sensor. If the controller 100 switches on a respective phase, and receives a current measurement indicating no current is detected at that phase, the controller 100 may determine that that phase is in the open condition. It should be understood that the controller 100 may determine that a phase is in the open circuit condition using any suitable technique. The controller 100 may determine a desired torque to be generated by the machine 19 based, at least, on input received from, for example, a handwheel of the steering system of the vehicle. It should be understood that the controller 100 may receive input indicating a desired output torque of the machine 19 in any suitable manner from any suitable component.

The controller 100 may retrieve a set of current values to be applied to each of the operating phases of the machine 19 based on which phase is in the open circuit condition and the desired torque. For example, the controller 100 may access a database or table configured to store sets of current values correlated with a desired torque (e.g. or a torque range) and a corresponding phase in the open circuit condition. The database or table may include any suitable database or table and may be remotely located from the vehicle, proximately located within the vehicle, or any suitable location.

The set of current values may be a predetermined set of current values that, when applied to the operating phases of the machine 19, cause the machine 19 to output the desired torque with reduced or no torque ripple. The set of current values (e.g., in the database or table) may be predetermined and programed and/or stored into the database or table during manufacturing of the machine 19 or periodically programmed and/or stored in the database or table during use of the machine 19 (e.g., over a period of use).

In some embodiments, the sets of current values stored in the database or table may be determined by a computing device (e.g., a laptop computing device, a mobile computing device, a desktop computing device, a server computing device, or any suitable computing device). A model of the machine 19, during normal or healthy operation (e.g., when all phases of the machine 19 are operating), may be described according to:

$$T_e^h = p\lambda_m \sum_{\substack{q=1,2,\ldots \\ k=a,b,\ldots}}^{n} I_k \sin(\theta_m - (q-1)\beta) = \frac{m}{2} p\lambda_m I_q$$

where $T_e^h$ represents the actual motor torque output under healthy conditions, p is the number of magnetic pole pairs, $\lambda_m$ is the permanent magnet (PM) flux linkage, m is the total number of phases, k represents the different phases, $I_q$ is the actual q-axis motor current and q is an integer with values between 1 to 5.

During an open circuit condition, a model of the machine 19 may be described according to:

$$T_e^f = T_e^h - p\lambda_m I_r \sin(\theta_m - r\beta)$$

-continued $$T_e^f = T_e^{f0} + T_e^{fp}$$

$$T_e^{f0} = \left(\frac{m-1}{2}\right) p\lambda_m I_q$$

$$T_e^{fp} = \frac{p\lambda_m}{2}(-I_d \sin(2(\theta_m - r\beta)) + I_q \cos(2(\theta_m - r\beta)))$$

where $T_e^f$ is the actual torque output under the open circuit condition, while $T_e^{f0}$ and $T_e^{fp}$ are the average and pulsating components of the torque output respectively, $I_d$ is the actual d-axis motor current and r represents an integer that is related to the specific phase that is open (e.g., for a first phase, r may equal 0, for a second phase, r may equal 1, and so on).

Using the aforementioned equations, the computing device may be configured to determine and apply sets of current commands, at 226 as is generally illustrated in FIG. 3B, in order to achieve desired current values, which may result in a desired torque output. The current commands may be used to generate corresponding duty cycles, which, when applied to the phases of the machine 19 result in desired current values at each respective phase. The computing device may determine different sets of current values different phases being in the open circuit condition. Additionally, or alternatively, the computing device may adjust the sets of current values based on various amounts of desired torque. The computing device may store a plurality of sets of current values each corresponding to a respective phase (e.g., in the open circuit condition) for corresponding desired torque amounts or desired torque ranges. In some embodiments, the sets of current values may be selectively adjusted by an operator of the computing device in order to achieve a desired response from the machine 19.

The computing device may modify each the plurality of sets of current commands (e.g., resulting in desired current values and may be referred to herein as the set of current values) in order to eliminate (e.g., or substantially reduce) torque ripple associated with the sets of current command values according to:

$$I_{dc}^m = I_{dc} + \Delta I_{dc}$$

$$I_{qc}^m = I_{qc} + \Delta I_{qc}$$

$$\Delta I_d = \frac{\sqrt{I_{dc}^2 + I_{qc}^2}}{n-1} \sin\left(2\theta_m - 2r\beta + \tan^{-1}\left(\frac{I_{dc}}{I_{qc}}\right)\right)$$

$$\Delta I_q = -\frac{\sqrt{I_{dc}^2 + I_{qc}^2}}{n-1} \cos\left(2\theta_m - 2r\beta + \tan^{-1}\left(\frac{I_{dc}}{I_{qc}}\right)\right)$$

In some embodiments, at the current controller 206 as is generally illustrated in FIG. 3B, the d/q axis current references may be converted to phase current commands by applying the inverse reference frame transformation involving measured electrical position $\theta_r$ and feedback controllers such as proportional-integral controller may be employed for each phase to generate the duty cycles for each phase.

A model of a final average torque (e.g., in response to the aforementioned equations being applied) can be described according to:

$$T_e^{m0} = \left(1 - \frac{1}{n-1}\right)\frac{n}{2}p\lambda_m = \left(1 - \frac{1}{n-1}\right)T_e^h$$

The computing device may determine, at 224 as is generally illustrated in FIG. 3B, a modified torque command under the open phase condition in order to maintain the originally commanded torque according to:

$$T_c^{m0} = \left(\frac{n-1}{n-2}\right)T_c$$

It should be noted that maintaining the originally commanded torque is merely an example, and the computing device may modify the torque command under the open phase condition in order to achieve any suitable commanded torque. The computing device may store, as described, the plurality of sets of current values in the database or table for access by the controller 100. As described, the controller 100 may retrieve, based on the determination of which phase is in the open circuit condition and the desired torque, the set of current values to be applied to each of the other phases of the machine 19 to achieve the desired torque. The controller 100 may apply respective current values of the set of current values to corresponding ones of the other phases of the machine. For example, the controller 100 may apply a first current of the set of current values to a first operating phase of the machine 19, a second current value of the set of current values to a second operating phase of the machine 19, and so on, for each of the operating phases of the machine 19.

In response to the controller 100 applying the set of current values to the operating phases of the machine 19, the machine 19 may generate the desired torque. Additionally, or alternatively, torque ripple generated by the machine 19 (e.g., in response to the phases being in the open conduction) may be controlled (e.g., eliminated or significantly reduced) based on the controller 100 applying the set of current values to the operating phases of the machine 19.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 4:
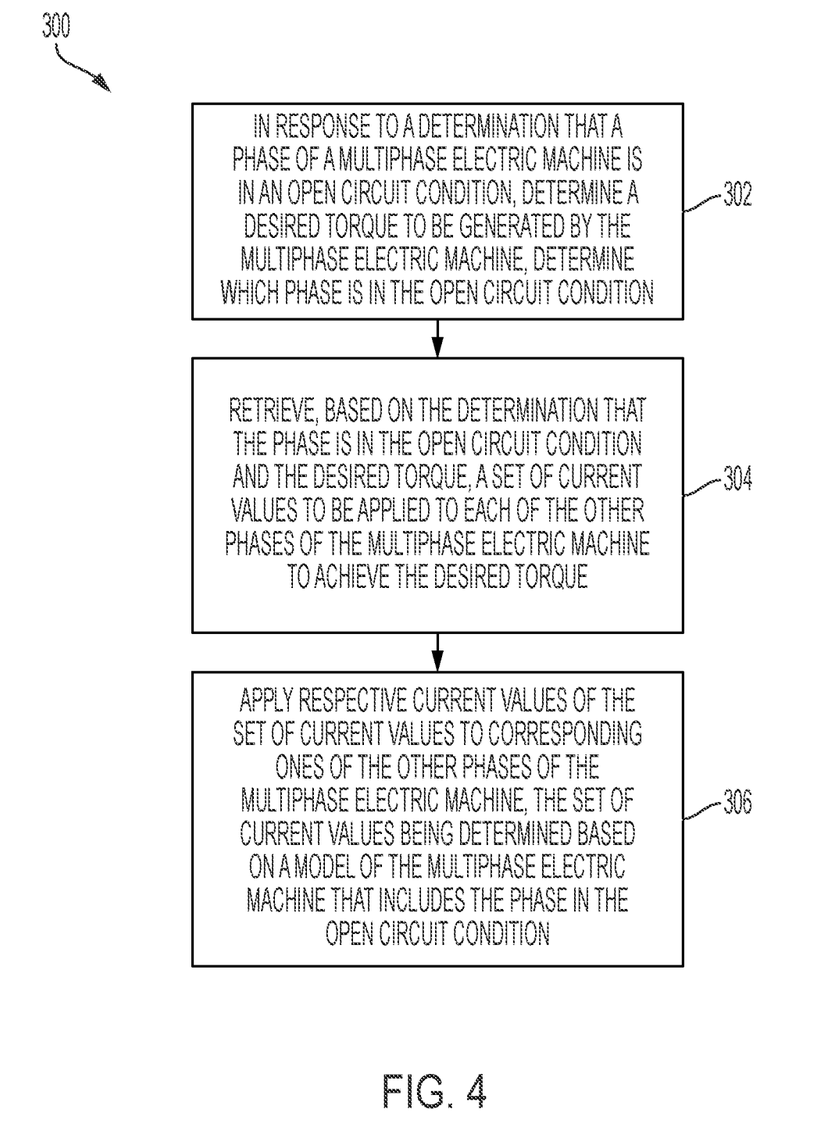
FIG. 4 is a flow diagram generally illustrating a multiphase electric machine control method according to the principles of the present disclosure.

FIG. 4 is a flow diagram generally illustrating a multiphase electric machine control method 300 according to the principles of the present disclosure. At 302, the method 300, in response to a determination that a phase of the multiphase electric machine is in an open circuit condition, machine 19 determines a desired torque to be generated by the multiphase electric machine. For example, the controller 100 determines a desired torque to be generated by the machine 19.

At 304, the method 300 retrieves, based on the determination that the phase is in the open circuit condition and the desired torque, a set of current values to be applied to each of the other phases of the multiphase electric machine to achieve the desired torque. For example, the controller 100 retrieves the set of current values to be applied to the operating phases of the machine 19 to achieve the desired torque.

At 306, the method 300 applies respective current values of the set of current values to corresponding ones of the other phases of the multiphase electric machine, the set of current values being determined based on a model of the multiphase electric machine that includes the phase is in the open circuit condition. For example, the controller 100 applies current values of the set of current values to corresponding operating phases of the operating phases of the machine 19. The controller 100 may control torque ripple of the machine 19 by applying the set of current values to the operating phases of the machine 19.

In some embodiments, a method for controlling a multiphase electric machine includes, in response to a determination that a phase of the multiphase electric machine is in an open circuit condition, determining a desired torque to be generated by the multiphase electric machine and retrieving, based on the determination that the phase is in the open circuit condition and the desired torque, a set of current values to be applied to each of the other phases of the multiphase electric machine to achieve the desired torque. The method may also include applying respective current values of the set of current values to corresponding ones of the other phases of the multiphase electric machine, the set of current values being determined based on a model of the multiphase electric machine that includes the phase is in the open circuit condition.

In some embodiments, applying the respective current values of the set of current values to the corresponding ones of the other phases of the multiphase electric machine controls torque ripple corresponding to torque generated by the multiphase electric machine in response to the respective current values of the set of current values being applied to the corresponding ones of the other phases of the multiphase electric machine. In some embodiments, the multiphase electric machine includes a salient pole multiphase electric machine. In some embodiments, the multiphase electric machine includes a non-salient pole multiphase electric machine. In some embodiments, the multiphase electric machine includes a permanent magnet multiphase electric machine. In some embodiments, multiphase electric machine includes a wound rotor. In some embodiments, the multiphase electric machine includes five phases. In some embodiments, the multiphase electric machine is associated with a steering system of a vehicle.

In some embodiments, a system for controlling a multiphase electric machine includes a processor and a memory. The memory includes instructions that, when executed by the processor, cause the processor to: in response to a determination that a phase of the multiphase electric machine is in an open circuit condition, determine a desired torque to be generated by the multiphase electric machine; retrieve, based on the determination that the phase is in the open circuit condition and the desired torque, a set of current values to be applied to each of the other phases of the multiphase electric machine to achieve the desired torque; and apply respective current values of the set of current values to corresponding ones of the other phases of the multiphase electric machine, the set of current values being determined based on a model of the multiphase electric machine that includes the phase is in the open circuit condition.

In some embodiments, the instructions further cause the processor to control torque ripple corresponding to torque generated by the multiphase electric machine in response to the respective current values of the set of current values being applied to the corresponding ones of the other phases of the multiphase electric machine. In some embodiments, the multiphase electric machine includes a salient pole multiphase electric machine. In some embodiments, the multiphase electric machine includes a non-salient pole multiphase electric machine. In some embodiments, the multiphase electric machine includes a permanent magnet multiphase electric machine. In some embodiments, the multiphase electric machine includes a wound rotor. In some embodiments, the multiphase electric machine includes five phases. In some embodiments, the multiphase electric machine is associated with a steering system of a vehicle.

In some embodiments, an apparatus for controlling a multiphase electric machine includes a processor and a memory. The memory includes instructions that, when executed by the processor, cause the processor to: in response to a determination that a phase of the multiphase electric machine is in an open circuit condition, determine a desired torque to be generated by the multiphase electric machine; retrieve, based on the determination that the phase is in the open circuit condition and the desired torque, a set of current values to be applied to each of the other phases of the multiphase electric machine to achieve the desired torque; and control torque ripple corresponding to the phase being in the open circuit condition by applying respective current values of the set of current values to corresponding ones of the other phases of the multiphase electric machine, the set of current values being determined based on a model of the multiphase electric machine that includes the phase is in the open circuit condition.

In some embodiments, the multiphase electric machine includes five phases. In some embodiments, the multiphase electric machine includes a salient pole multiphase electric machine. In some embodiments, the multiphase electric machine includes a non-salient pole multiphase electric machine.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

It should be noted that the various technical features described herein facilitate improvements to motor control systems. The description herein uses an electric power steering system (EPS) as an example that uses a motor control system, which is improved using and/or implementing the various technical features described herein. However, the technical solutions described herein are not limited to electric power steering systems, rather are applicable in motor control systems used in any other system, such as an industrial motor, a biomechanical device, an automated drive assist system, or any other electric machine that uses a motor control system.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A method for controlling a multiphase electric machine, the method comprising:
   in response to a determination that a phase of the multiphase electric machine is in an open circuit condition, determining a desired torque to be generated by the multiphase electric machine;
   retrieving, based on the determination that the phase is in the open circuit condition and the desired torque, a set of current values to be applied to each of the other phases of the multiphase electric machine to achieve the desired torque; and
   applying respective current values of the set of current values to corresponding ones of the other phases of the multiphase electric machine, the set of current values being determined based on a model of the multiphase electric machine that includes the phase is in the open circuit condition.

2. The method of claim 1, wherein applying the respective current values of the set of current values to the corresponding ones of the other phases of the multiphase electric machine controls torque ripple corresponding to torque generated by the multiphase electric machine in response to the respective current values of the set of current values being applied to the corresponding ones of the other phases of the multiphase electric machine.

3. The method of claim 1, wherein the multiphase electric machine includes a salient pole multiphase electric machine.

4. The method of claim 1, wherein the multiphase electric machine includes a non-salient pole multiphase electric machine.

5. The method of claim 1, wherein the multiphase electric machine includes a permanent magnet multiphase electric machine.

6. The method of claim 1, wherein the multiphase electric machine includes a wound rotor.

7. The method of claim 1, wherein the multiphase electric machine includes five phases.

8. The method of claim 1, wherein the multiphase electric machine is associated with a steering system of a vehicle.

9. A system for controlling a multiphase electric machine, the system comprising:
   a processor; and
   a memory including instructions that, when executed by the processor, cause the processor to:
      in response to a determination that a phase of the multiphase electric machine is in an open circuit condition, determine a desired torque to be generated by the multiphase electric machine;
      retrieve, based on the determination that the phase is in the open circuit condition and the desired torque, a set of current values to be applied to each of the other phases of the multiphase electric machine to achieve the desired torque; and
      apply respective current values of the set of current values to corresponding ones of the other phases of the multiphase electric machine, the set of current values being determined based on a model of the multiphase electric machine that includes the phase is in the open circuit condition.

10. The system of claim 9, wherein the instructions further cause the processor to control torque ripple corresponding to torque generated by the multiphase electric machine in response to the respective current values of the set of current values being applied to the corresponding ones of the other phases of the multiphase electric machine.

11. The system of claim 9, wherein the multiphase electric machine includes a salient pole multiphase electric machine.

12. The system of claim 9, wherein the multiphase electric machine includes a non-salient pole multiphase electric machine.

13. The system of claim 9, wherein the multiphase electric machine includes a permanent magnet multiphase electric machine.

14. The system of claim 9, wherein the multiphase electric machine includes a wound rotor.

15. The system of claim 9, wherein the multiphase electric machine includes five phases.

16. The system of claim 9, wherein the multiphase electric machine is associated with a steering system of a vehicle.

17. An apparatus for controlling a multiphase electric machine, the apparatus comprising:
- a processor; and
- a memory including instructions that, when executed by the processor, cause the processor to:
  - in response to a determination that a phase of the multiphase electric machine is in an open circuit condition, determine a desired torque to be generated by the multiphase electric machine;
  - retrieve, based on the determination that the phase is in the open circuit condition and the desired torque, a set of current values to be applied to each of the other phases of the multiphase electric machine to achieve the desired torque; and
  - control torque ripple corresponding to the phase being in the open circuit condition by applying respective current values of the set of current values to corresponding ones of the other phases of the multiphase electric machine, the set of current values being determined based on a model of the multiphase electric machine that includes the phase is in the open circuit condition, wherein the multiphase electric machine is associated with a steering system of a vehicle.

18. The apparatus of claim 17, wherein the multiphase electric machine includes five phases.

19. The apparatus of claim 17, wherein the multiphase electric machine includes a salient pole multiphase electric machine.

20. The apparatus of claim 17, wherein the multiphase electric machine includes a non-salient pole multiphase electric machine.

* * * * *